(12) United States Patent
Milios

(10) Patent No.: US 7,936,150 B2
(45) Date of Patent: May 3, 2011

(54) BATTERY CELL PROTECTION AND CONDITIONING CIRCUIT AND SYSTEM

(75) Inventor: Ioannis Milios, New York, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 12/678,486

(22) PCT Filed: Feb. 17, 2010

(86) PCT No.: PCT/US2010/024495
§ 371 (c)(1),
(2), (4) Date: Mar. 16, 2010

(87) PCT Pub. No.: WO2010/117498
PCT Pub. Date: Oct. 14, 2010

(65) Prior Publication Data
US 2011/0068745 A1    Mar. 24, 2011

Related U.S. Application Data

(60) Provisional application No. 61/164,894, filed on Mar. 30, 2009.

(51) Int. Cl.
*H02J 7/00* (2006.01)
*H02J 7/04* (2006.01)

(52) U.S. Cl. ........ 320/119; 320/120; 320/134; 320/132; 320/157

(58) Field of Classification Search ................ 320/119, 320/120, 118, 134, 136, 135, 132, 141, 145, 320/157, 153
See application file for complete search history.

(56) References Cited

U.S. PATENT DOCUMENTS

| | | | | |
|---|---|---|---|---|
| 5,640,079 A | * | 6/1997 | Nelson et al. | 320/153 |
| 5,648,714 A | * | 7/1997 | Eryou et al. | 320/139 |
| 5,780,991 A | | 7/1998 | Brake et al. | |
| 5,869,949 A | | 2/1999 | Nishikawa et al. | |
| 5,920,181 A | * | 7/1999 | Alberkrack et al. | 320/146 |

(Continued)

FOREIGN PATENT DOCUMENTS

JP    09-084275    3/1997

(Continued)

OTHER PUBLICATIONS

International Search Report in PCT/US10/24495 mailed Oct. 14, 2010.

(Continued)

*Primary Examiner* — Edward Tso
*Assistant Examiner* — Alexis Boateng
(74) *Attorney, Agent, or Firm* — Oppedahl Patent Law Firm LLC

(57) ABSTRACT

A type of protection and cell conditioning circuit is proposed that partly uses the typically existing hardware present in traditional cell-protection circuits and that can achieve an optimum state of charge for the individual cell independently from the actions of the external battery charger. For minimum cost, the proposed circuit and system can solve the battery-cell-balancing problem, while optimizing the performance of the battery pack and while simultaneously enhancing the safety of the battery pack. Multiple battery cells can be communicatively combined to form large batteries. Information from and commands to each of the individual battery cells can be relayed through a low-power serial bus in order to form "intelligent" and optimally managed battery systems.

42 Claims, 2 Drawing Sheets

U.S. PATENT DOCUMENTS

| | | | |
|---|---|---|---|
| 6,037,750 A * | 3/2000 | Von Novak | 320/132 |
| 6,437,540 B2 | 8/2002 | Sonobe | |
| 6,511,764 B1 | 1/2003 | Marten | |
| 6,518,725 B2 | 2/2003 | Marten | |
| 6,566,844 B1 * | 5/2003 | Schlicht | 320/131 |
| 6,856,118 B1 * | 2/2005 | Lindqvist et al. | 320/147 |
| 7,400,113 B2 | 7/2008 | Osborne | |
| 7,489,106 B1 | 2/2009 | Tikhonov | |
| 7,633,266 B2 * | 12/2009 | Lu et al. | 320/140 |
| 7,656,128 B2 * | 2/2010 | Biggs, Jr. | 320/139 |
| 7,786,702 B1 * | 8/2010 | Chait et al. | 320/145 |
| 2002/0190692 A1 | 12/2002 | Marten | |
| 2004/0012375 A1 * | 1/2004 | Bucur | 320/141 |
| 2006/0087303 A1 * | 4/2006 | Hartular et al. | 323/283 |
| 2008/0303483 A1 | 12/2008 | Okuto | |
| 2009/0128094 A1 | 5/2009 | Okuto | |
| 2009/0140696 A1 | 6/2009 | Okuto | |
| 2010/0090662 A1 | 4/2010 | Okuto | |

FOREIGN PATENT DOCUMENTS

| | | |
|---|---|---|
| JP | 2001-095170 | 9/1999 |
| JP | 2001-217012 | 8/2001 |
| JP | 2007-335337 | 12/2007 |
| JP | 2008-067486 | 3/2008 |
| WO | 01-56062 | 8/2001 |
| WO | 2008-137764 | 11/2008 |
| WO | 2010/117494 | 10/2010 |

OTHER PUBLICATIONS

Written Opinion in PCT/US10/24495 mailed Oct. 14, 2010.

* cited by examiner

BATTERY CELL PROTECTION AND CONDITIONING CIRCUIT AND SYSTEM

CROSS-REFERENCE TO RELATED APPLICATIONS

This application claims the benefit of U.S. application No. 61/164,894, filed Mar. 30, 2009, which application is incorporated herein by reference for all purposes.

BACKGROUND OF THE INVENTION

The combination of lithium-ion cells in order to create large-scale batteries gives rise to a new set of safety, performance, and efficiency problems. One of the most significant problems relating to the performance and safety of the pack has to do with the fact that cells connected in series differ in capacity. Ideally, the cells should be in sync and charged optimally to their respective maximum capacity. One proposed solution to sync the cells and reach this optimized charge is described in PCT Publication No. WO/2008/137764, "Fine-Controlled Battery-Charging System", to Sendyne Corp. et al. In addition, during discharge, the series-connected cells should all discharge to their cutoff voltage at the same time. Using today's technology, cells participating in a series connection are charged until any cell reaches its maximum capacity. Similarly, discharging and utilization of the battery pack is terminated again as soon as any participating cell reaches its cutoff voltage. It is obvious that series-connected cells that do not start at the same state of charge will also discharge out of sync, resulting in a early termination of overall battery discharge operations when additional battery capacity should have been available.

The Traditional Lithium-Ion Cell-Protection Circuit

Traditionally, lithium-ion batteries include a protection circuit for added safety. FIG. 1 illustrates the functional blocks of such a circuit. The protection circuit typically includes a voltage sensor [1] that will detect an over-voltage condition during charging, or an under-voltage condition during discharging or when in storage. A current sensor [2] monitors current through the battery cell [7] in order to prevent discharge or charge currents from exceeding specific safety values. A temperature sensor [3] is used during charging to detect cell overheating. A charge-detection circuit [4] detects the presence of a charger in order to initiate and control the charging process. All of this information is collected and processed in the system-logic module, which controls a set of switches [6] that can turn open or close the charging or discharging current path. This protection circuit is currently used as a stand-alone unit that act unsupervised in situations that threaten battery-pack safety.

In multi-cell battery packs, such as in the case of notebook-computer battery packs, protection circuits exist that can accommodate three or four cells, providing the same basic functionality as in the case of a single cell, while eliminating redundant components such as the discharge/charge FETs [6].

However, the methods such as that described above to solve this problem have thus far presented serious safety and cost drawbacks. Consequently, those proposed methods have failed to be adopted in the industry.

BRIEF SUMMARY OF THE INVENTION

The present inventive disclosures include the description of a system that uses features of the ubiquitous cell-protection circuit, which are typically integrated in most lithium-ion battery cells today, in order to provide battery-cell charge conditioning for achieving maximum state of charge, without compromising battery-cell safety.

This proposed new type of protection and cell conditioning circuit partly uses the typically existing hardware present in traditional cell-protection circuits and that can achieve an optimum state of charge for the individual cell independently from the actions of the external battery charger. For minimum cost, the proposed circuit and system can solve the battery-cell-balancing problem, while optimizing the performance of the battery pack and while simultaneously enhancing the safety of the battery pack. Each individual cell within a battery pack has its own cell-protection circuitry, which is designed to autonomously control the final stage of the individual battery-cell charge. Multiple battery cells can be communicatively combined to form large batteries. Information from and commands to each of the individual battery cells can be relayed through a low-power serial bus in order to form "intelligent" and optimally managed battery systems.

DETAILED DESCRIPTION

First Embodiment—General Overview

Figure 1:
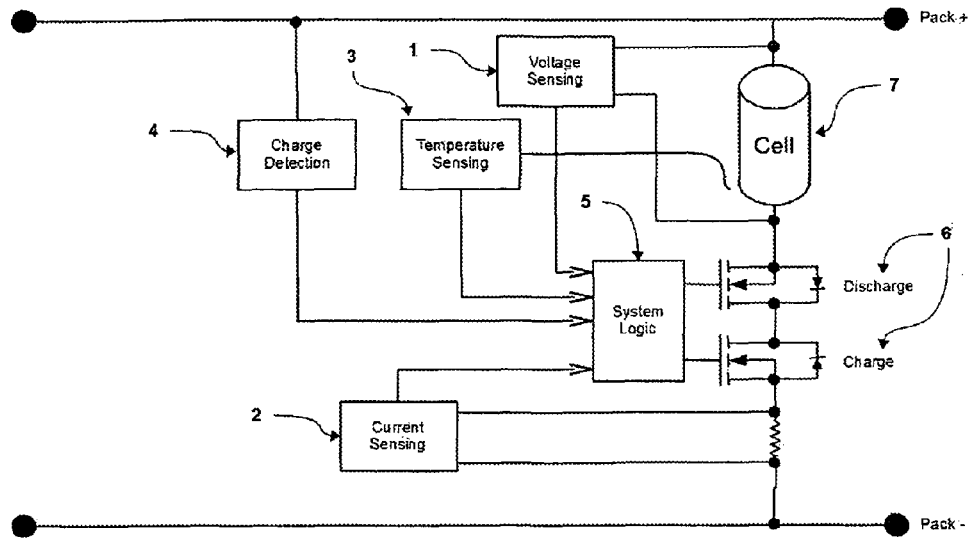
FIG. 1 depicts a version of a traditional (i.e., prior art) cell-protection circuit.

Refer to FIG. 1, which illustrates the functional blocks of a traditional lithium-ion battery-protection circuit. The protection circuit typically includes a voltage sensor [1] that will detect an over-voltage condition during charging, or an under-voltage condition during discharging or when in storage. A current sensor [2] monitors current through the battery cell [7] in order to prevent discharge or charge currents from exceeding specific safety values. A temperature sensor [3] is used during charging to detect cell overheating. A charge-detection circuit [4] detects the presence of a charger in order to initiate and control the charging process. All of this information is collected and processed in the system-logic module, which controls a set of switches [6] that can turn open or close the charging or discharging current path. This protection circuit is currently used as a stand-alone unit that act unsupervised in situations that threaten battery-pack safety.

In multi-cell battery packs, such as in the case of notebook-computer battery packs, protection circuits exist that can accommodate three or four cells, providing the same basic functionality as in the case of a single cell, while eliminating redundant components such as the discharge/charge FETs [6].

Figure 2:
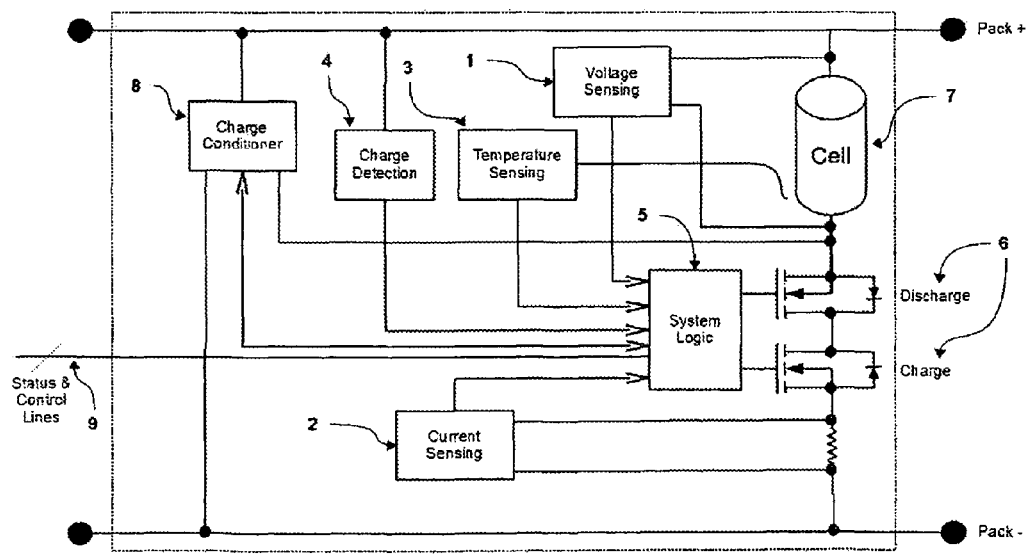
FIG. 2 depicts a modified version of a traditional (i.e., prior art) cell-protection circuit, which includes the addition of a "charge conditioner" circuit.

Refer to FIG. 2, which depicts an enhanced lithium-ion battery-protection circuit (departing from the prior-art "traditional" circuit), wherein a charge conditioner [8] has been added. The charge conditioner [8] is a simple low-power, constant-voltage-limited-current charger that can be utilized through external control whenever the cell reaches a specific state of charge from an external constant-voltage/constant-current (CV/CC) charger. The purpose of the charge-conditioner circuit [8] is to provide maximum state of charge for the individual battery cell independently and after the individual battery cell has been charged by an external CV/CC charger. The charge conditioner [8] can achieve this goal by eliminating the need for the external charger to monitor precisely the voltage of the individual battery cell and by letting each individual cell in the battery pack to complete the charging process by itself. It should be appreciated that the charge-conditioner circuit [8] uses hardware blocks/modules that already exist within the traditional protection circuit described above, such as the voltage and current sensors [FIG. 1: 1, 2], as well as the charge/discharge gates/switches [FIG. 1: 6].

Commands to and status signals from the charge conditioner [8] can be communicated through a set of status & control lines [9]. The same circuit can be used to provide an initial low-current charge in situations where the individual cell has reached an undercharge condition.

In a typical charging scenario, the external battery-pack charger will go initially through the constant-current stage of charging and subsequently part of the constant-voltage stage. As soon as the battery pack state of charge reaches a predetermined state, the battery-pack controller will enable the internal charge conditioners in each cell participating in the battery pack. The battery-pack charger at this state will provide power only to the individual cell-charge-conditioning circuits [8]. The internal charge conditioners [8] will subsequently perform a constant-voltage charge to each individual battery cell until all of the individual battery cells have reached their maximum state of charge.

Figure 3:
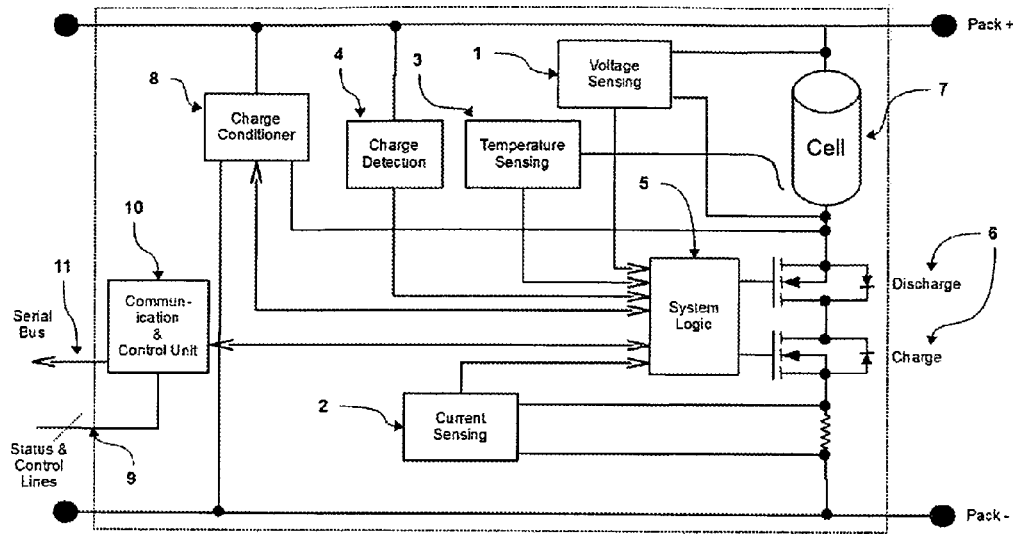
FIG. 3 depicts a further modified version of a traditional (i.e., prior art) cell-protection circuit, which includes the addition of a "charge conditioner" circuit, a "communication & control unit", and a multiple-access serial bus, where the addition of the latter two components facilitates the coordination of charge/discharge operations between many battery cells that are connected in series.

Refer to FIG. 3, which depicts a further modified version of a traditional (i.e., prior art) cell-protection circuit, and which includes the addition of a charge-conditioner circuit [8], status & control lines [9], a communication & control unit [10], and a multiple-access serial bus [11], where the addition of the latter two components facilitates the coordination of charge/discharge operations between many battery cells [7] that are connected in series. In situations where a lot of battery cells [7] are connected in series, communication can be achieved through a multiple-access serial bus [11]. A communication & control unit [10] can be used to implement not only the communication protocol, but also to provide other important information, such as the present state of charge, overall health of the individual battery cell, etc. Such a communication bus [11] can be a derivative of System Management Bus (SMBus), which is commonly used in a laptop smart battery, or can be any other programmable-address bus that will allow for the "hot-swapping" of individual cells within a battery pack.

Figure 4:
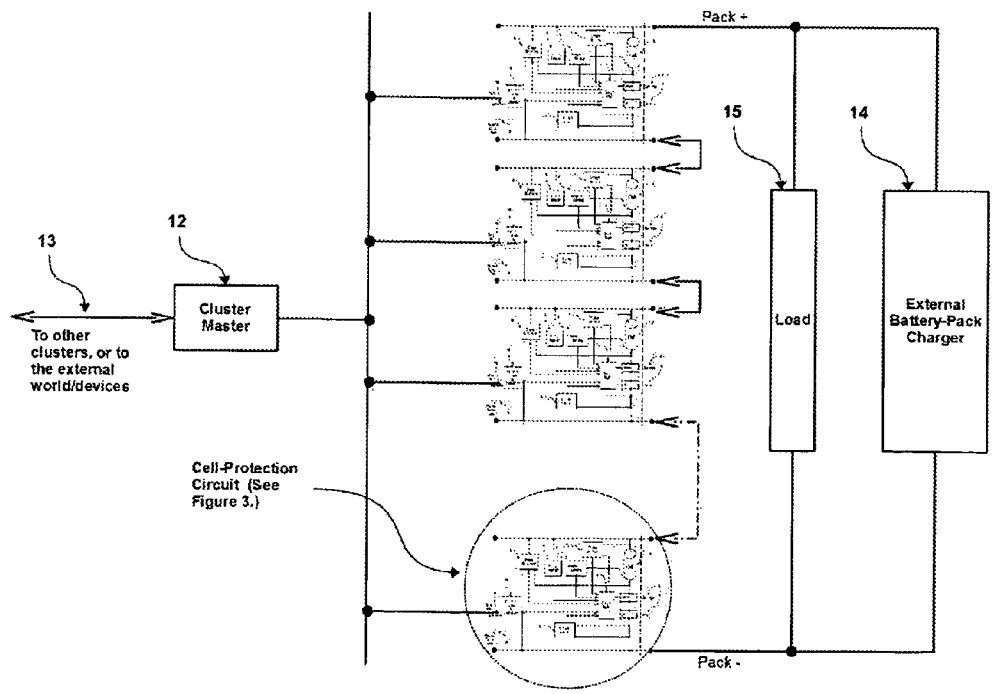
FIG. 4 illustrates how individual battery cells can be combined under the supervision of a "Cluster Master" circuit to form a large battery.

Refer to FIG. 4, which illustrates how individual battery cells can be combined under the supervision of a "cluster master" circuit to form a large battery. The cluster master [12] can communicate with the external world (e.g., computers, etc.) through one of the commercially implemented wired (e.g., USB) or wireless (WIFI) communication protocols [13]. Multiple master clusters [12] can also be combined; that is, configured to communicate with each other through the same path [13]; to form even larger batteries.

Second Embodiment—System for Charging and Conditioning Battery Cells

This embodiment encompasses a system for charging and conditioning the cells in a battery bank. The battery bank comprises a plurality of cells in connected in series, each of the plurality of cells defining a respective condition of charge. The system has an external constant-voltage/constant-current (CV/CC) battery charger. Each individual cell in the battery bank has a cell-protection circuit, with each of cell-protection circuits having a charge detector, a voltage sensor, a sensor for detecting charging current and discharging current, and switches for opening or closing the discharging or charging current path through the associated individual battery cell. Each cell-protection circuit further comprises a charge conditioner, with the charge conditioner being a constant-voltage-limited-current charger that is externally controlled and used when the associated battery cell reaches a predetermined state of charge from the external CV/CC battery charger.

The charge conditioner is capable of assuming the responsibility of precisely monitoring the voltage of the individual battery cell from the external CV/CC battery charger, wherein the charge conditioner is capable of completing the charging process of its associated individual battery cell by itself, and wherein the charge conditioner is communicatively coupled to the external CV/CC battery charger via a communication channel and onboard system-logic circuitry in order to facilitate communication of the associated individual battery-cell status to the external CV/CC battery charger and in order to facilitate control signaling between the charge conditioner and the external CV/CC battery charger. The external CV/CC battery charger can provide the initial constant-current stage of charging the battery bank, followed by part of the constant-voltage stage of charging the battery bank until the battery pack reaches a predetermined state of charge.

When the battery pack reaches a predetermined state of charge, the controller for the external CV/CC battery charger can enable each individual-battery-cell charge conditioner to complete the charging within the battery pack. When each individual-battery-cell-charge conditioner is enabled, then the external CV/CC battery charger provides power only to the individual-battery-cell charge conditioners, during which condition the individual-battery-cell charge conditioners can perform an independent constant-voltage charge for their associated individual battery cells until all of the individual battery cells have reached at least their maximum rated state of charge.

This embodiment can be further extended wherein said charge conditioners can provide an initial low-current charge to its associated individual battery cell in situations where said individual battery cell has reached an undercharge condition, and wherein said initial low-current charge is provided independently of any instructions or controls from said external CV/CC battery charger.

This embodiment can be further extended where the system further comprises a multiple-access communications channel and a communication & control unit, wherein the multiple-access communications channel and the communication & control unit facilitates the coordination of charge and discharge operations between multiple series-connected battery cells and said external CV/CC battery charger, wherein the coordination includes the use of a communication protocol, and wherein the coordination includes the provision of parameter information relating to the state of charge and overall health of the associated individual battery cell.

This embodiment can be further extended wherein the multiple-access communications channel is a multiple-access, serial bus.

This embodiment can be further extended wherein the multiple-access, serial bus is a programmable-address bus.

This embodiment can be further extended wherein the multiple-access, serial bus is a derivative of System Management Bus (SMBus).

This embodiment can be further extended wherein any of the individual battery cells can be hot-swapped within the battery pack and wherein the cell-protection circuits of any hot-swapped individual battery cells can communicate their respective status to, and coordinate their respective charge and discharge operations with, the external CV/CC battery charger and other series-connected battery cells within the battery pack This embodiment can be further extended wherein the system comprises a cluster master for supervising the charge and discharge operations of multiple said individual battery cells within the battery pack, thus forming a cluster and a wired or wireless communication channel, wherein the cluster master can communicate with external devices through a commercially implemented wired or wireless communication protocol.

This embodiment can be further extended wherein the cluster master is in communication with a computer.

This embodiment can be further extended wherein the cluster master is in communication with an external battery charger.

This embodiment can be further extended wherein the cluster master is in communication with other clusters using the same said wired or wireless communication channel in order to effectively form a larger battery.

This embodiment can be further extended wherein the communication protocol is USB or WIFI.

This embodiment can be further extended wherein the battery bank is comprised of lithium-ion battery cells.

Third Embodiment—Method for Charging and Conditioning Battery Cells

This embodiment encompasses a method for charging and conditioning the cells in a battery bank. The battery bank comprises a plurality of cells connected in series, each of the plurality of cells defining a respective condition of charge. The method comprises the step of providing a system having an external constant-voltage/constant-current (CV/CC) battery charger. Each individual cell within the battery bank has a cell-protection circuit, with each of the cell-protection circuits having a charge detector, a voltage sensor, a sensor for detecting charging current and discharging current, and switches for opening or closing the discharging or charging current path through said associated individual battery cell.

The method further comprises the step of providing in each cell-protection circuit a charge conditioner, with the charge conditioner being a constant-voltage-limited-current charger that is externally controlled and used when said associated battery cell reaches a predetermined state of charge from the external CV/CC battery charger.

The charge conditioner is capable of assuming the responsibility of precisely monitoring the voltage of the individual battery cell from the external CV/CC battery charger. The charge conditioner is capable of completing the charging process of its associated individual battery cell by itself. The charge conditioner is communicatively coupled to the external CV/CC battery charger via a communication channel and onboard system-logic circuitry in order to facilitate communication of the associated individual battery-cell status to the external CV/CC battery charger and in order to facilitate control signaling between the charge conditioner and the external CV/CC battery charger. The external CV/CC battery charger can provide the initial constant-current stage of charging said battery bank, followed by part of the constant-voltage stage of charging said battery bank until said battery pack reaches a predetermined state of charge.

When said battery pack reaches a predetermined state of charge, the controller for the external CV/CC battery charger can enable each individual-battery-cell charge conditioner to complete the charging within said battery pack. When each individual-battery-cell-charge conditioner is enabled, then said external CV/CC battery charger provides power only to the individual-battery-cell charge conditioners, during which condition the individual-battery-cell charge conditioners can perform an independent constant-voltage charge for their associated individual battery cells until all of the individual battery cells have reached at least their maximum rated state of charge.

This embodiment can be further extended wherein the charge conditioners can provide an initial low-current charge to its associated individual battery cell in situations where the individual battery cell has reached an undercharge condition and wherein the initial low-current charge is provided independently of any instructions or controls from the external CV/CC battery charger.

This embodiment can be further extended wherein the method further comprises the steps of providing in each cell-protection circuit a multiple-access, serial bus communications channel and providing in each cell-protection circuit a communication & control unit, wherein the multiple-access communications channel and the communication & control unit facilitates the coordination of charge and discharge operations between multiple series-connected battery cells and the external CV/CC battery charger, wherein the coordination includes the use of a communication protocol, and wherein the coordination includes the provision of parameter information relating to the state of charge and overall health of the associated individual battery cell.

This embodiment can be further extended wherein the multiple-access communications channel is a multiple-access, serial bus.

This embodiment can be further extended wherein the multiple-access, serial bus is a programmable-address bus.

This embodiment can be further extended wherein the multiple-access, serial bus is a derivative of System Management Bus (SMBus).

This embodiment can be further extended wherein any of the individual battery cells can be hot-swapped within the battery pack and wherein the cell-protection circuits of any hot-swapped individual battery cells can communicate their respective status to, and coordinate their respective charge and discharge operations with, the external CV/CC battery charger and other series-connected battery cells within the battery pack.

This embodiment can be further extended wherein the method further comprises the steps of providing a cluster master for supervising the charge and discharge operations of multiple individual battery cells within the battery pack, thus forming a cluster; and providing a wired or wireless communication channel, wherein the cluster master can communicate with external devices through a commercially implemented wired or wireless communication protocol.

This embodiment can be further extended wherein the cluster master is in communication with a computer.

This embodiment can be further extended wherein the cluster master is in communication with an external battery charger.

This embodiment can be further extended wherein the cluster master is in communication with other clusters using the same said wired or wireless communication channel in order to effectively form a larger battery.

This embodiment can be further extended wherein said communication protocol is USB or WIFI.

This embodiment can be further extended wherein said battery bank is comprised of lithium-ion battery cells.

Fourth Embodiment—Method for Charging and Conditioning Battery Cells

This embodiment encompasses a method for charging and conditioning the cells in a battery bank using a system according to the Second Embodiment described above, comprising the steps of: By the external CV/CC battery charger, providing the initial constant-current stage of charging the battery bank; by the external CV/CC battery charger, providing constant-voltage charging of the battery bank until the battery pack reaches a predetermined state of charge; by the external CV/CC battery charger controller, when the battery pack reaches the predetermined state of charge, enabling each individual-battery-cell charge conditioner to complete the charging within the battery pack; wherein when each individual-battery-cell-charge conditioner is enabled, then the external CV/CC battery charger provides power only to the individual-battery-cell charge conditioners; by the individual-battery-cell charge conditioners, performing an independent constant-voltage charge for their associated individual battery cells until all of the individual battery cells have reached at least their maximum rated state of charge.

This embodiment can be further extended wherein the charge conditioners can provide an initial low-current charge to its associated individual battery cell in situations where the individual battery cell has reached an undercharge condition, and wherein the initial low-current charge is provided independently of any instructions or controls from the external CV/CC battery charger.

This embodiment can be further extended wherein the system used for charging and conditioning the cells within said battery bank further comprises: in each cell-protection circuit, a multiple-access communications channel and a communication & control unit, wherein the multiple-access communications channel and the communication & control unit facilitates the coordination of charge and discharge operations between multiple series-connected battery cells and the external CV/CC battery charger, wherein the coordination includes the use of a communication protocol, and wherein the coordination includes the provision of parameter information relating to the state of charge and overall health of the associated individual battery cell.

This embodiment can be further extended wherein said multiple-access communications channel is a multiple-access, serial bus.

This embodiment can be further extended wherein said multiple-access, serial bus is a programmable-address bus.

This embodiment can be further extended wherein said multiple-access, serial bus is a derivative of System Management Bus (SMBus).

This embodiment can be further extended wherein the method further comprises the steps of hot-swapping one or more of the individual battery cells within the battery pack with new battery cells, and, by the cell-protection circuits of the hot-swapped individual battery cells, communicating their respective battery-cell status to, and coordinating their respective charge and discharge operations with, the external CV/CC battery charger and other series-connected battery cells within said battery pack.

This embodiment can be further extended wherein the system used for charging and conditioning the cells within the battery bank further comprises a cluster master for supervising the charge and discharge operations of multiple individual battery cells within the battery pack, thus forming a cluster, and a wired or wireless communication channel; and the method further comprising the step of, by the cluster master, communicating the charge status of each individual battery cell within the cluster and the overall charge status of the cluster with external devices through a commercially implemented wired or wireless communication protocol.

This embodiment can be further extended wherein the cluster master is in communication with a computer.

This embodiment can be further extended wherein the cluster master is in communication with an external battery charger.

This embodiment can be further extended wherein the cluster master is in communication with other clusters using the same wired or wireless communication channel in order to effectively form a larger battery.

This embodiment can be further extended wherein the communication protocol is USB or WIFI.

This embodiment can be further extended wherein the battery bank is comprised of lithium-ion battery cells.

Potential Obvious Variations and Improvements

Those skilled in the art will have no difficulty devising myriad obvious variations and improvements to the invention, all of which are intended to be encompassed within the scope of the claims which follow.

What is claimed is:

1. A system for charging and conditioning the cells in a battery bank, said battery bank comprising a plurality of cells in connected in series, each of the plurality of cells defining a respective condition of charge; said system having an external constant-voltage/constant-current (CV/CC) battery charger; each individual cell in said battery bank having a cell-protection circuit, each of said cell-protection circuit having a charge detector, a voltage sensor, a sensor for detecting charging current and discharging current, and switches for opening or closing the discharging or charging current path through said associated individual battery cell; each cell-protection circuit further comprising:

a charge conditioner, said charge conditioner being a constant-voltage-limited-current charger that is externally controlled and used when said associated battery cell reaches a predetermined state of charge from said external CV/CC battery charger, wherein said charge conditioner is capable of assuming the responsibility of precisely monitoring the voltage of the individual battery cell from said external CV/CC battery charger, wherein said charge conditioner is capable of completing the charging process of its associated individual battery cell by itself, and wherein said charge conditioner is communicatively coupled to said external CV/CC battery charger via a communication channel and onboard system-logic circuitry in order to facilitate communication of said associated individual battery-cell status to said external CV/CC battery charger and in order to facilitate control signaling between said charge conditioner and said external CV/CC battery charger;

wherein said external CV/CC battery charger can provide the initial constant-current stage of charging said battery bank, followed by part of the constant-voltage stage of charging said battery bank until said battery pack reaches a predetermined state of charge;

wherein when said battery pack reaches a predetermined state of charge, the controller for said external CV/CC battery charger can enable each individual-battery-cell charge conditioner to complete the charging within said battery pack;

wherein when each individual-battery-cell-charge conditioner is enabled, then said external CV/CC battery charger provides power only to said individual-battery-cell charge conditioners, during which condition said individual-battery-cell charge conditioners can perform an independent constant-voltage charge for their associated individual battery cells until all of said individual battery cells have reached at least their maximum rated state of charge.

2. The system of claim 1, wherein said charge conditioners can provide an initial low-current charge to its associated individual battery cell in situations where said individual battery cell has reached an undercharge condition, and wherein said initial low-current charge is provided independently of any instructions or controls from said external CV/CC battery charger.

3. The system of claim 1, said cell-protection circuit further comprising:
a multiple-access communications channel; and
a communication & control unit,
wherein said multiple-access communications channel and said communication & control unit facilitates the coordination of charge and discharge operations between multiple series-connected battery cells and said external CV/CC battery charger,
wherein said coordination includes the use of a communication protocol, and
wherein said coordination includes the provision of parameter information relating to the state of charge and overall health of said associated individual battery cell.

4. The system of claim 3, wherein said multiple-access communications channel is a multiple-access, serial bus.

5. The system of claim 4, wherein said multiple-access, serial bus is a programmable-address bus.

6. The system of claim 5, wherein said multiple-access, serial bus is a derivative of System Management Bus (SM-Bus).

7. The system of claim 3, wherein:
any of said individual battery cells can be hot-swapped within said battery pack; and
wherein the cell-protection circuits of any hot-swapped individual battery cells can communicate their respective status to, and coordinate their respective charge and discharge operations with, said external CV/CC battery charger and other series-connected battery cells within said battery pack.

8. The system of claim 3, further comprising:
a cluster master for supervising the charge and discharge operations of multiple said individual battery cells within said battery pack, thus forming a cluster; and
a wired or wireless communication channel,
wherein said cluster master can communicate with external devices through a commercially implemented wired or wireless communication protocol.

9. The system of claim 8, wherein said cluster master is in communication with a computer.

10. The system of claim 8, wherein said cluster master is in communication with an external battery charger.

11. The system of claim 8, wherein said cluster master is in communication with other clusters using the same said wired or wireless communication channel in order to effectively form a larger battery.

12. The system of claim 8, wherein said communication protocol is USB.

13. The system of claim 8, wherein said communication protocol is WIFI.

14. The system of claim 8, wherein said battery bank is comprised of lithium-ion battery cells.

15. A method for charging and conditioning the cells in a battery bank, said battery bank comprising a plurality of cells connected in series, each of the plurality of cells defining a respective condition of charge; comprising the step of providing a system having an external constant-voltage/constant-current (CV/CC) battery charger; a cell-protection circuit in each individual cell in said battery bank, each of said cell-protection circuit having a charge detector, a voltage sensor, a sensor for detecting charging current and discharging current, and switches for opening or closing the discharging or charging current path through said associated individual battery cell; the method further comprising the step of:
providing in each said cell-protection circuit a charge conditioner, said charge conditioner being a constant-voltage-limited-current charger that is externally controlled and used when said associated battery cell reaches a predetermined state of charge from said external CV/CC battery charger,
wherein said charge conditioner is capable of assuming the responsibility of precisely monitoring the voltage of the individual battery cell from said external CV/CC battery charger,
wherein said charge conditioner is capable of completing the charging process of its associated individual battery cell by itself, and
wherein said charge conditioner is communicatively coupled to said external CV/CC battery charger via a communication channel and onboard system-logic circuitry in order to facilitate communication of said associated individual battery-cell status to said external CV/CC battery charger and in order to facilitate control signaling between said charge conditioner and said external CV/CC battery charger;
wherein said external CV/CC battery charger can provide the initial constant-current stage of charging said battery bank, followed by part of the constant-voltage stage of charging said battery bank until said battery pack reaches a predetermined state of charge;
wherein when said battery pack reaches a predetermined state of charge, the controller for said external CV/CC battery charger can enable each individual-battery-cell charge conditioner to complete the charging within said battery pack;
wherein when each individual-battery-cell-charge conditioner is enabled, then said external CV/CC battery charger provides power only to said individual-battery-cell charge conditioners, during which condition said individual-battery-cell charge conditioners can perform an independent constant-voltage charge for their associated individual battery cells until all of said individual battery cells have reached at least their maximum rated state of charge.

16. The method of claim 15, wherein said charge conditioners can provide an initial low-current charge to its associated individual battery cell in situations where said individual battery cell has reached an undercharge condition, and
wherein said initial low-current charge is provided independently of any instructions or controls from said external CV/CC battery charger.

17. The method of claim 15, further comprising the steps of:
providing in each said cell-protection circuit a multiple-access, serial bus communications channel; and
providing in each said cell-protection circuit a communication & control unit,
wherein said multiple-access communications channel and said communication & control unit facilitates the coordination of charge and discharge operations between multiple series-connected battery cells and said external CV/CC battery charger,
wherein said coordination includes the use of a communication protocol, and
wherein said coordination includes the provision of parameter information relating to the state of charge and overall health of said associated individual battery cell.

18. The method of claim 17, wherein said multiple-access communications channel is a multiple-access, serial bus.

19. The method of claim 18, wherein said multiple-access, serial bus is a programmable-address bus.

20. The method of claim 19, wherein said multiple-access, serial bus is a derivative of System Management Bus (SM-Bus).

21. The method of claim 17, wherein:
any of said individual battery cells can be hot-swapped within said battery pack; and
wherein the cell-protection circuits of any hot-swapped individual battery cells can communicate their respective status to, and coordinate their respective charge and discharge operations with, said external CV/CC battery charger and other series-connected battery cells within said battery pack.

22. The method of claim 17, further comprising the steps of:
providing a cluster master for supervising the charge and discharge operations of multiple said individual battery cells within said battery pack, thus forming a cluster; and
providing a wired or wireless communication channel, wherein said cluster master can communicate with external devices through a commercially implemented wired or wireless communication protocol.

23. The method of claim 22, wherein said cluster master is in communication with a computer.

24. The method of claim 22, wherein said cluster master is in communication with an external battery charger.

25. The method of claim 22, wherein said cluster master is in communication with other clusters using the same said wired or wireless communication channel in order to effectively form a larger battery.

26. The method of claim 22, wherein said communication protocol is USB.

27. The method of claim 22, wherein said communication protocol is WIFI.

28. The method of claim 22, wherein said battery bank is comprised of lithium-ion battery cells.

29. A method for charging and conditioning the cells in a battery bank using a system according to claim 1, comprising the steps of:
by said external CV/CC battery charger, providing the initial constant-current stage of charging said battery bank;
by said external CV/CC battery charger, providing constant-voltage charging of said battery bank until said battery pack reaches a predetermined state of charge;
by said external CV/CC battery charger controller, when said battery pack reaches said predetermined state of charge, enabling each individual-battery-cell charge conditioner to complete the charging within said battery pack;
wherein when each individual-battery-cell-charge conditioner is enabled, then said external CV/CC battery charger provides power only to said individual-battery-cell charge conditioners;
by said individual-battery-cell charge conditioners, performing an independent constant-voltage charge for their associated individual battery cells until all of said individual battery cells have reached at least their maximum rated state of charge.

30. The method of claim 29, wherein said charge conditioners can provide an initial low-current charge to its associated individual battery cell in situations where said individual battery cell has reached an undercharge condition, and
wherein said initial low-current charge is provided independently of any instructions or controls from said external CV/CC battery charger.

31. The method of claim 29, wherein the system used for charging and conditioning the cells within said battery bank further comprises:
in each said cell-protection circuit, a multiple-access communications channel; and
in each said cell-protection circuit, a communication & control unit,
wherein said multiple-access communications channel and said communication & control unit facilitates the coordination of charge and discharge operations between multiple series-connected battery cells and said external CV/CC battery charger,
wherein said coordination includes the use of a communication protocol, and
wherein said coordination includes the provision of parameter information relating to the state of charge and overall health of said associated individual battery cell.

32. The method of claim 31, wherein said multiple-access communications channel is a multiple-access, serial bus.

33. The method of claim 32, wherein said multiple-access, serial bus is a programmable-address bus.

34. The method of claim 33, wherein said multiple-access, serial bus is a derivative of System Management Bus (SM-Bus).

35. The method of claim 31, further comprising the steps of:
hot-swapping one or more of said individual battery cells within said battery pack with new battery cells,
by the cell-protection circuits of said hot-swapped individual battery cells, communicating their respective battery-cell status to, and coordinating their respective charge and discharge operations with, said external CV/CC battery charger and other series-connected battery cells within said battery pack.

36. The method of claim 31, wherein the system used for charging and conditioning the cells within said battery bank further comprises a cluster master for supervising the charge and discharge operations of multiple said individual battery cells within said battery pack, thus forming a cluster; and a wired or wireless communication channel;
the method further comprising the step of:
by said cluster master, communicating the charge status of each individual battery cell within said cluster and the overall charge status of sai cluster with external devices through a commercially implemented wired or wireless communication protocol.

37. The method of claim 36, wherein said cluster master is in communication with a computer.

38. The method of claim 36, wherein said cluster master is in communication with an external battery charger.

39. The method of claim 36, wherein said cluster master is in communication with other clusters using the same said wired or wireless communication channel in order to effectively form a larger battery.

40. The method of claim 36, wherein said communication protocol is USB.

41. The method of claim 36, wherein said communication protocol is WIFI.

42. The method of claim 36, wherein said battery bank is comprised of lithium-ion battery cells.

* * * * *